United States Patent
Chung et al.

(10) Patent No.: US 9,515,474 B2
(45) Date of Patent: Dec. 6, 2016

(54) POWER OFF DEVICE FOR CUTTING OFF SUPPLY OF ELECTRIC POWER THROUGH SENSING OF VARIOUS ARC AND OVERLOAD

(71) Applicants: Tae Young Chung, Seoul (KR); Dea Sang Kim, Gimhae-si (KR)

(72) Inventors: Tae Young Chung, Seoul (KR); Dea Sang Kim, Gimhae-si (KR)

(*) Notice: Subject to any disclaimer, the term of this patent is extended or adjusted under 35 U.S.C. 154(b) by 77 days.

(21) Appl. No.: 14/402,690

(22) PCT Filed: May 24, 2013

(86) PCT No.: PCT/KR2013/004552
§ 371 (c)(1),
(2) Date: Nov. 21, 2014

(87) PCT Pub. No.: WO2013/187616
PCT Pub. Date: Dec. 19, 2013

(65) Prior Publication Data
US 2015/0138684 A1     May 21, 2015

(30) Foreign Application Priority Data

Jun. 15, 2012 (KR) .................. 10-2012-0064151

(51) Int. Cl.
   *H02H 3/08*       (2006.01)
   *H02H 1/00*       (2006.01)
   *H02H 3/093*      (2006.01)

(52) U.S. Cl.
   CPC ........... *H02H 1/0015* (2013.01); *H02H 3/093* (2013.01)

(58) Field of Classification Search
CPC .......... H02H 3/08; H02H 3/093; H02H 3/021; H02H 1/0015
USPC .......................................................... 361/94
See application file for complete search history.

(56) References Cited

U.S. PATENT DOCUMENTS

| | | | |
|---|---|---|---|
| 5,729,145 A * | 3/1998 | Blades | G01R 31/1272 324/522 |
| 7,558,034 B2 | 7/2009 | Bonasia et al. | |
| 7,924,537 B2 | 4/2011 | Mernyk | |
| 2002/0024782 A1* | 2/2002 | Kim | H02H 1/0015 361/42 |

(Continued)

FOREIGN PATENT DOCUMENTS

| | | |
|---|---|---|
| KR | 10-0914999 B1 | 9/2009 |
| KR | 10-2010-0115483 A | 10/2010 |
| KR | 10-2011-0123965 A | 11/2011 |

*Primary Examiner* — Scott Bauer
(74) *Attorney, Agent, or Firm* — Revolution IP, PLLC

(57) ABSTRACT

Disclosed is a power off device which includes a micro arc detector for turning on a first switching element, based on a voltage induced in a high frequency choke coil by a high frequency pulse current caused by micro arc at a power line, a high current arc detector for outputting a high current arc detection current during turning-on of a second switching element made based on variation of a magnetic field generated at a coil, a delay unit for accumulatively charging the micro arc detection current or the high current arc detection current in a delay capacitor at a predetermined time constant, a power off unit for electrically disconnecting a load from the power line when an operating voltage is applied, and a first switch for connecting the operating voltage to the power off unit in response to the arc detection signal.

13 Claims, 10 Drawing Sheets

(56) References Cited

U.S. PATENT DOCUMENTS

2009/0040666 A1\* 2/2009 Elms ..................... H02H 3/334
　　　　　　　　　　　　　　　　　　　　　　361/42

\* cited by examiner

POWER OFF DEVICE FOR CUTTING OFF SUPPLY OF ELECTRIC POWER THROUGH SENSING OF VARIOUS ARC AND OVERLOAD

CROSS REFERENCE TO PRIOR APPLICATIONS

This application is a National Stage Application of PCT International Patent Application No. PCT/KR2013/004552 filed on May 24, 2013, under 35 U.S.C. §371, which claims priority to Korean Patent Application No. 10-2012-0064151 filed on Jun. 15, 2012, which are all hereby incorporated by reference in their entirety.

TECHNICAL FIELD

The present invention relates to a power off device, and more particularly to a power off device capable of cutting off supply of electric power through sensing of various arc and overload generated at an electric line.

BACKGROUND ART

Abnormal situations occurring due to failure of an electric line, failure of grounding, failure of a load, user error, etc. during use of an electric device for domestic or industrial purposes are exhibited through various types such as line short circuit and load over-current or arc.

Power off devices commonly called power outlets or sockets or multi strips or power boards do not have a function to sense an abnormal situation. Even when the power off devices have such a function, this function is only to cut off supply of electric power when several limited kinds of situations including, for example, leakage of electricity, are sensed. Electric leakage protection devices installed at electric lines in most buildings and houses only detect leakage of electricity. Thus, general power off devices often cannot detect abnormal situations other than leakage of electricity, and have a limitation in preventing electrical accidents.

Meanwhile, leakage of electricity is known as a cause of a fire. In practice, however, the possibility that a fire occurs due to leakage of electricity is low, even though the possibility that waste of electricity or electric shock occurs due to leakage of electricity is high. For this reason, power off devices, which only have a function to cut off supply of electricity through detection of leakage of electricity, have difficulty in providing an effect of preventing occurrence of a fire.

Rather, electrical fires may often occur due to spark ignition of arc caused by malfunction of an electric line or an electric appliance on an inflammable material therearound, overheat caused by overload, namely, overcurrent flowing through a load, or overheat generated when a terminal electric line connected to a load functions as a small capacity load under the condition that the terminal electric line is short-circuited, even though overcurrent does not flow through the load.

Meanwhile, although the possibility that a fire is generated due to arc is high, generation of arc is readily observed when a power switch is turned on, or a plug is connected or disconnected. For this reason, if supply of power is cut off whenever arc is detected, normal use of electric appliances may be difficult. Therefore, it is necessary to provide a power off circuit and a power off device, which can appropriately cut off supply of power by discriminating between short arc that may be generated when the user powers on or off and continuous arc that may generate a fire.

DISCLOSURE

Technical Problem

Therefore, the present invention has been made in view of the above problems, and it is an object of the present invention to provide a power off device capable of detecting continuous voltage type micro arc and high current type arc, which may generate a fire, thereby cutting off supply of power.

Another object of the present invention is to provide a power off device capable of cutting off supply of power, not only when micro arc or high arc is generated, but also when overheat is generated at an electric line due to overload or when momentary voltage drop is generated due to malfunction of an electric line.

Technical Solution

In accordance with an aspect of the present invention, the above and other objects can be accomplished by the provision of power off device including:

a micro arc detector for turning on a first switching element, based on a voltage induced in a high frequency choke coil by a high frequency pulse current caused by micro arc at a power line, and outputting a micro arc detection current during turning-on of the first switching element;

a high current arc detector for outputting a high current arc detection current during turning-on of a second switching element made based on variation of a magnetic field generated at a coil installed at the power line due to high current arc at the power line;

a delay unit for accumulatively charging the micro arc detection current or the high current arc detection current in a delay capacitor at a predetermined time constant, and outputting an arc detection signal when a voltage across the delay capacitor reaches a predetermined level;

a power off unit for electrically disconnecting a load from the power line when an operating voltage is applied; and a first switch for connecting the operating voltage to the power off unit in response to the arc detection signal.

In accordance with an embodiment, the micro arc detector may include an inductor installed at the power line, to establish a loop together with the high frequency choke coil.

The loop may include a second capacitor connected in series between the inductor and a first terminal of the high frequency choke coil, a first diode, and a first capacitor, the first diode and the first capacitor being connected in series between the inductor and a second terminal of the high frequency choke coil.

A fourth diode may be connected between the second terminal of the high frequency choke coil and another power line.

The high frequency choke coil may be connected in common, at the first terminal of the high frequency choke coil, to a control terminal of the first switching element and the second capacitor via a high frequency rectifier diode, and may be connected, at the second terminal of the high frequency choke coil, to an input terminal of the first switching element, an anode of the second diode, and an anode of the fourth diode.

In accordance with an embodiment, the high current arc detector may turn on the second switching element, based on a voltage induced in a current transformer in accordance with variation of a magnetic field generated at the coil installed at the power line due to current variation caused by high current arc at the power line, and may output a high current arc detection current during turning-on of the second switching element, to cause the high current arc detection current to flow through the second switching element.

In accordance with an embodiment, the second switching element of the high current arc detector may be a reed switch.

The high current arc detector may output a high current arc detection current during turning-on of the reed switch made based on variation of a magnetic field generated at the coil installed at the power line due to current variation caused by high current arc at the power line, to cause the high current arc detection current to flow through the reed switch.

In accordance with an embodiment, the delay unit may include:

a delay resistor for discharging a charge accumulated in the delay capacitor by at least a portion of the micro arc detection current or at least a portion of the high current arc detection current;

a constant voltage element to turn on when a voltage accumulated in the delay capacitor reaches a predetermined level; and a third switching element to turn on when the constant voltage element turns on, so as to output the arc detection signal.

In accordance with an embodiment, the first switch may include a coupling element for electrically connecting the power line and the power off unit when the arc detection signal is applied to a control terminal of the first switch.

In accordance with an embodiment, the power off unit may include a self-retaining relay to be electrically insulated from the load when the operating voltage is connected to the self-retaining relay as the first switch is turned on by the arc detection signal, and to maintain the electrically insulated state from the load even after the arc detection signal disappears.

In accordance with an embodiment, the self-retaining relay may include:

a drive coil to be magnetized when the operating voltage is connected to the drive coil in accordance with turning-on of the first switch or a voltage from the power line is applied to the drive coil; and a triple terminal switch to be magnetically switched by magnetization of the drive coil from a position, at which the power line and the load are connected, to a position, at which the power line and the drive coil are connected.

In accordance with an embodiment, the power off unit may further include a manual return switch installed between the triple terminal switch and the drive coil.

The connection between the drive coil and the power line may be disconnected when the manual return switch is opened during operation of the drive coil, and the triple terminal switch may be switched to the position, at which the power line and the load are connected, simultaneously with the disconnection.

In accordance with an embodiment, the power off device may further include an overload detector for outputting an overload detection signal when a DC voltage rectified from an AC voltage induced in a current transformer due to current variation caused by overload or short circuit exceeds a predetermined level.

In accordance with an embodiment, the power off device may further include a second switch for connecting the operating voltage to the power off unit in response to the overload detection signal.

In accordance with an embodiment, the power off device may further include an operating voltage generator for charging the rectified voltage in a capacitor connected between the power line and another power line, and supplying the charged voltage as the operating voltage.

In accordance with an embodiment, the power off device may further include an overload detector for connecting the operating voltage to the power off unit via a second reed switch during turning-on of the second reed switch made based on variation of a magnetic field generated at a second coil installed at the power line due to current variation caused by overload or short circuit at the power line.

In accordance with an embodiment, the power off device according to claim 13 may further include an operating voltage generator for charging a rectified voltage in a capacitor connected between the power line and another power line, and supplying the charged voltage as the operating voltage.

Advantageous Effects

In accordance with the power off device of the present invention, it may be possible to prevent an accident, for example, a fire, caused by sparks, arc, overload, voltage drop, or overheat, which may be generated due to an abnormal state of an electric line, an electric appliance, or the like, that is, poor connection, short circuit, overload, line overheat, line resistance variation, or the like, using a single power off device.

In particular, it may be possible to cope with an accident by sensing micro arc that may be generated within an electric appliance or sensing high current type arc.

In addition, the power off device does not require a ground line, and is simply applicable to a single-phase AC line. Accordingly, the power off device may be widely used as an independent power off device or may be additionally installed at existing domestic and industrial power off devices.

DESCRIPTION OF DRAWINGS

The above and other objects, features and other advantages of the present invention will be more clearly understood from the following detailed description taken in conjunction with the accompanying drawings, in which.

BEST MODE

Figure 1:
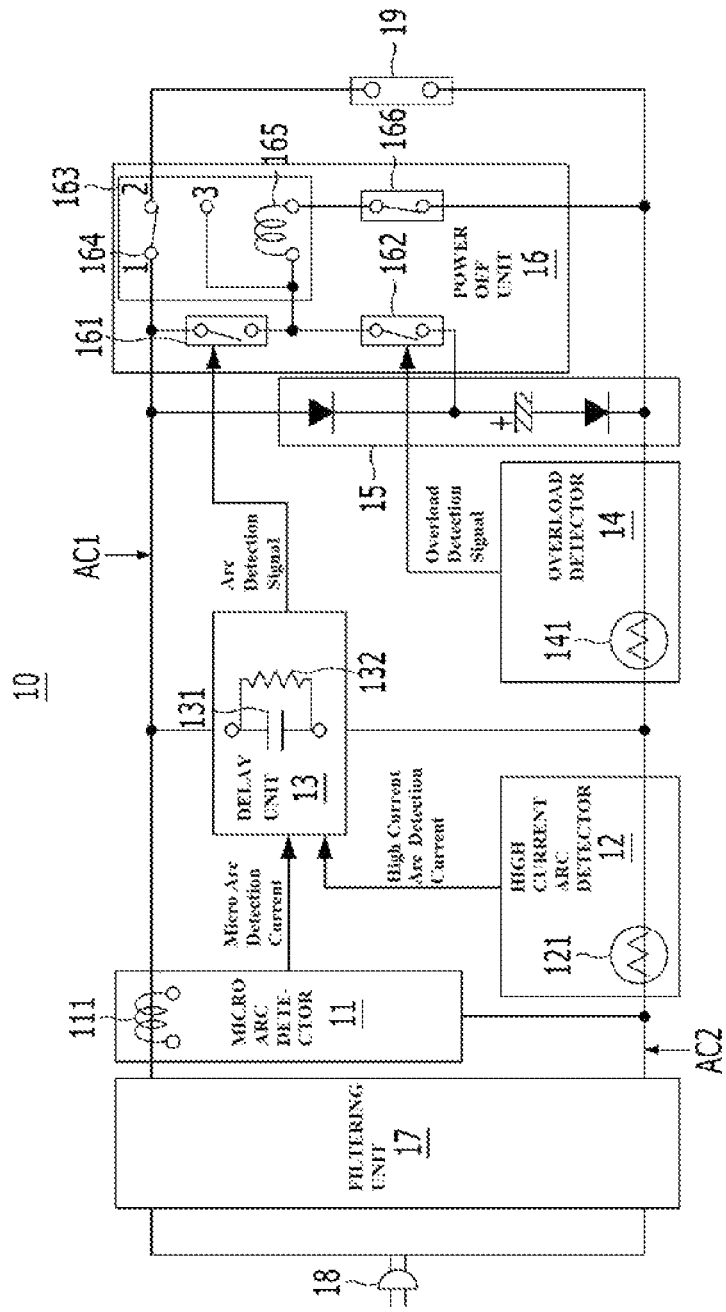
FIG. 1 is a block diagram illustrating a power off device according to an embodiment of the present invention.

For embodiments of the present invention disclosed herein, specific structural or functional descriptions are exemplary to merely describe the embodiments of the present invention, and the embodiments of the present invention can be implemented in various forms and should not be interpreted as being limited to the embodiments described in the present specification.

Hereinafter, preferred embodiments of the present invention will be described in detail with reference to the accompanying drawings, and the same or similar elements are designated by the same numeral references regardless of the numerals in the drawings and redundant description thereof will be omitted.

Figure 2:
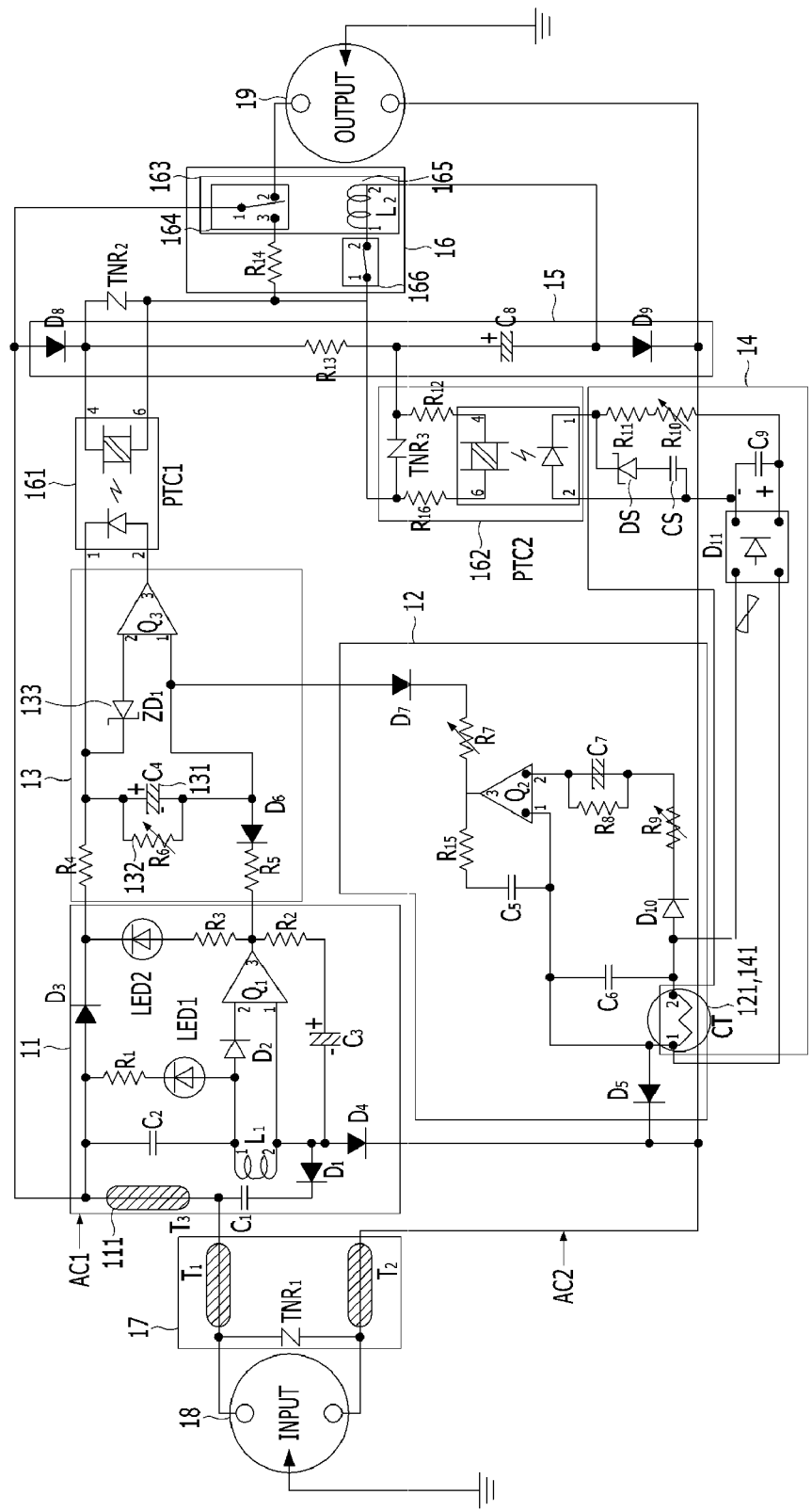
FIG. 2 is a circuit diagram concretely illustrating the power off device according to the embodiment of the present invention.

FIG. 1 is a block diagram illustrating a power off device according to an embodiment of the present invention. FIG. 2 is a circuit diagram concretely illustrating the power off device according to the embodiment of the present invention.

Referring to FIGS. 1 and 2, the power off device, which is designated by reference numeral "10", may generally include an input power terminal 18 at a grid power input side such as an input plug to be inserted into, for example, a so-called power outlet, and an output power terminal 19 such as a socket, into which, for example, a plug of a load device, is to be inserted. The power off device 10 may also include a micro arc detector 11, a high current arc detector 12, a delay unit 13, an overload detector 14, an operating voltage generator 15, and a power off unit 16, which are arranged between the input power terminal 18 and the output power terminal 19. The power off device 10 may further include a filtering unit 17.

Hereinafter, each constituent element will be described in brief.

The micro arc detector 11 applies, to the delay unit 13, a micro arc detection current corresponding to an intensity of micro arc detected by a voltage sensor 111 connected to a power line AC1, for example, an inductor T3, whenever micro arc is detected.

For example, when a voltage type micro arc scarcely accompanying current is generated at a load device or a power line, the micro arc detector 11 detects a high-frequency pulse generated due to the micro arc, which propagates along the power line, based on a voltage induced in the inductor T3. Whenever such a high-frequency pulse is detected, the micro arc detector 11 outputs, to the delay unit 13, a micro arc detection current having the form of a pulse with an amplitude and a width corresponding to those of the detected high-frequency pulse.

The high current arc detector 12 applies, to the delay unit 13, a high arc detection current corresponding to an intensity of high arc accompanying high current, whenever the high arc is detected by a current sensor 121 using a coil capable of inducing variation of a magnetic field, for example, a current transformer CT.

Meanwhile, when a middle or high current type arc, which may generate a fire even when the arc is generated once or twice, is generated at an electric load device, the high current arc detector 12 may detect such middle or high arc, based on a voltage induced at the current transformer by an induced AC voltage and a high-frequency pulse current, which are exhibited at a power line due to the middle or high current arc. When the detected induced AC voltage and high-frequency pulse current are equal to or higher than a predetermined level and a predetermined value, respectively, the high current arc detector 12 applies, to the delay unit 13, a high current arc detection current having the form of a pulse with a level and a generation time corresponding to those of the induced AC voltage.

The delay unit 13 may be implemented using an integrator capable of accumulating a micro arc detection current or a high current arc detection current. Such an integrator may be implemented using, for example, a delay capacitor 131 and a delay resistor 132. In this case, the delay capacitor 131 may be charged with a micro arc detection current or a high current arc detection current. The charge accumulated in the delay capacitor 131 may be discharged by the delay resistor 132 at a predetermined time constant.

When the delay capacitor 131 is charged to a predetermined voltage or higher as a micro arc detection current or a high current arc detection current is continuously or strongly generated to reach a predetermined amount, the delay unit 13 generates an arc detection signal, and outputs the generated arc detection signal to a first switch 161 of the power off unit 16.

For example, when the voltage type micro arc detected by the micro arc detector 11 is continuous micro arc having a possibility to generate a fire, or the current type high arc detected by the high current arc detector 12 is a strong and continuous arc capable of generating a fire, a charge is accumulated in the delay capacitor 131 by the continuous micro arc detection current or high current arc detection current and, as such, the voltage across the delay capacitor 131 rises to a higher level than a predetermined voltage level. As a result, an arc detection signal is generated.

On the other hand, when the detected micro arc or high current arc is temporary and momentary, the charge accumulated in the delay capacitor 131 is discharged by the delay resistor 132 and, as such, the accumulated detection signal disappears with the passage of time. Accordingly, there is no danger of fire. In addition, there is no occasion that power is turned off due to such a momentary arc.

Although the micro arc detector 11 and high current arc detector 12 are designed to use the delay unit 13 in common in the embodiment of FIG. 2, they may be designed to use separate delay circuits, respectively, in accordance with another embodiment. In this case, the delay circuits may output respective arc detection signals which may be, in turn, connected to respective switches of the power off unit 16, to activate the switches.

When current increase or voltage drop occurs in a power line due to overload or short circuit, the overload detector 14 generates an overload detection signal, and outputs the overload detection signal to a second switch 162 of the power off unit 16.

For example, the overload detector 14 may detect an abrupt increase in AC current caused by overload of a power line AC2 or an abrupt increase in AC current caused by abnormal voltage drop, using a current sensor 141, for example, a current transformer CT, thereby generating an overload detection signal.

In accordance with embodiments, the current sensor 121 of the high current arc detector 12 and the current sensor 141 of the overload detector 14 may be implemented using separate current transformers, respectively, or may use a single current transformer in common.

When the overload detector 14 detects an abrupt increase in AC current caused by voltage drop, it may be difficult for the power off unit 16 to normally operate, due to low voltage of the power line AC1. To this end, when the second switch 162 is closed in accordance with an overload detection signal output from the overload detector 14 in response to voltage drop, the operating voltage generator 15, which is normally charged with an appropriate operating voltage, may supply the charged operating voltage as a drive voltage required for normal operation to the relay 163 via the second switch 162.

When the first switch 161 is closed by an arc detection signal, or the second switch 162 is closed by an overload detection signal, the power line AC1 connected to the output power terminal 19 via the relay 163 is disconnected and, as such, the power off unit 16 may cut off supply of power.

In accordance with an embodiment, the first switch 161 or second switch 162 may be implemented using an element capable of electrically connecting the relay 163 to an AC supply voltage or a DC operating voltage or disconnecting the electrical connection in accordance with a signal output from the delay unit 13 or overload detector 14, for example, a dual terminal switch, a photocoupler, or a dual terminal relay.

Meanwhile, the relay 163 of the power off unit 16 includes a triple terminal switch 164 installed at electric wires between the input power terminal 18 and the output power terminal 19. The triple terminal switch 164 operates to be connected to the output power terminal 19 or to a drive coil 165 in accordance with operation of the first and second switches 161 and 162 and, as such, the power off unit 16 may enable supply of electric power to a load or may cut off the supply of electric power.

For example, in the relay 163, the drive coil 165, which may be a solenoid drive coil, operates in accordance with a DC voltage charged in the operating voltage generator 15 when the second switch 162 is closed. In this case, the connection contact of the triple terminal switch 164 is moved from a terminal 2 to a terminal 3 in accordance with operation of the solenoid drive coil 165 and, as such, electrical connection between the input power terminal 18 and the output power terminal 19 is disconnected. The relay 163 may be implemented using an electric device capable of performing a similar operation to the relay, for example, a switch or the like, differently than elements having a relay function.

Once the power off unit 16 cuts off supply of electric power to a load, the power-off state may be continued, so long as electric power from the outside is supplied to the power off unit 16 via the input power terminal 18. In addition, the power off unit 16 may further include a manual return switch 166 for manually resuming supply of power under the condition that supply of power has been cut off due to arc or overload. When supply of electric power to the power off unit 16 is cut off by disconnecting the input power terminal 18 from a wall outlet or operating the manual return switch 166, the power off unit 16 returns to a connection state established before the power-off operation. In a closed state of the manual return switch 166, the power-off state is maintained. When the manual return switch 166 is subsequently opened by the user, the relay 163 is returned to an original connection state, to be again connected to a power path and, as such, power is again supplied.

Figure 3:
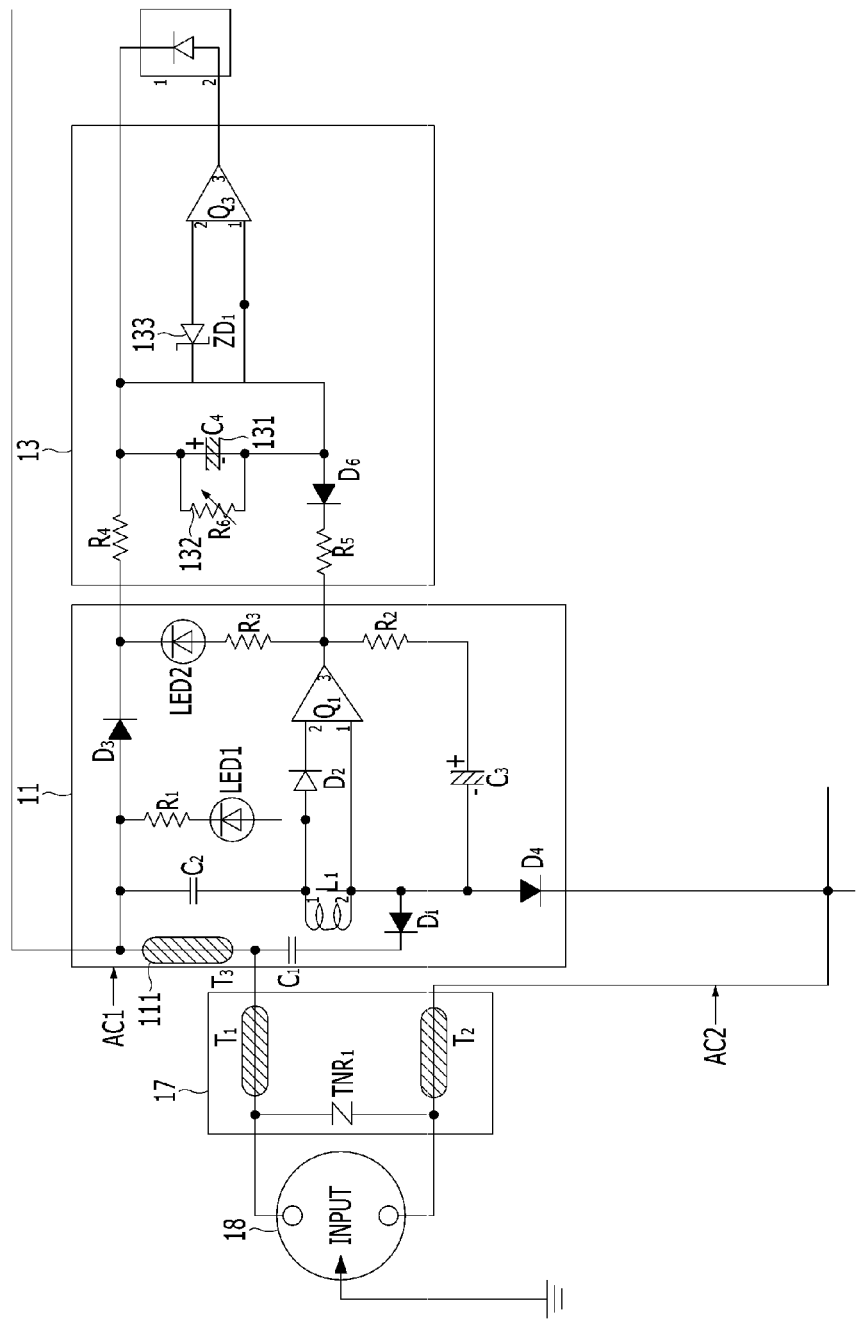
FIG. 3 is a circuit diagram illustrating a micro arc detector in the power off device according to an embodiment of the present invention.

The configuration and operation of the micro arc detector 11 will be described in more detail with reference to FIGS. 1, 2, and 3. FIG. 3 illustrates a concrete circuit diagram of the micro arc detector in the power off device according to an embodiment of the present invention.

In brief, the micro arc detector 11 detects a high frequency pulse caused by micro arc generated at the power line AC1 or AC2 by the inductor 111 (T3) and a choke coil L1 connected between the power lines AC1 and AC2. In accordance with detection of a high frequency pulse, the micro arc detector 11 turns on a first switching element Q1. During an ON state of the first switching element Q1, a micro arc current is output to the delay capacitor 131, which has a predetermined time constant, and, as such, the delay capacitor 131 is accumulatively charged.

Micro arc may be momentarily generated when a plug is connected or disconnected or a power switch is turned on or off. Such micro arc may also be continuously generated for several seconds due to malfunction of an electric load or a power line. In the former case, power-off should be prevented or is unnecessary. In the latter case, however, power-off should be achieved because there is a danger of fire.

Micro arc generated at a load or a power line is exhibited in the form of a pulse current having a frequency component ranging from several kHz to several GHz. Such a high frequency pulse current propagates along an AC power line, and the propagation is then prevented by the filtering unit 17 and, as such, the high frequency pulse current may be detected by the micro arc detector 11. The micro arc detector 11 outputs a micro arc detection current whenever detecting a high frequency pulse.

The filtering unit 17 installed at the power lines allows a low frequency AC component of normal commercial power to pass therethrough while preventing a high frequency pulse caused by micro arc generated at a load from being propagated to a grid. In addition, the filtering unit 17 may perform an assistance function to cause the high frequency pulse caused by micro arc to activate operation of the micro arc detector 11.

For this function, the filtering unit 17 may include two inductors T1 and T2 installed at the AC power lines AC1 and AC2 while being connected in series. The first inductor T1 and second inductor T2 are high frequency inductors capable of preventing passage of high frequency components having a predetermined frequency or higher.

In detail, the high frequency inductors T1 and T2, which are installed between input ends of the AC power lines AC1 and AC2 or both ends of a load, suppress a high frequency pulse generated at a load from being propagated to a grid at the side of the input terminal 18 while preventing external high frequency surge from being propagated from the input terminal 18. Thus, it may be possible to prevent the power off device 10 from being damaged.

Meanwhile, the filtering unit 17 may further include a TNR connected in parallel to the power lines at the side of the input terminal 18 in order to absorb surge transmitted from the outside. The TNR is a non-linear variable resistor (NVR), and is trademarked.

In a normal state, no frequency voltage capable of activating operation of the micro arc detector 11 is exhibited at the power lines, at which the filtering unit 17 is installed. However, when a high frequency pulse current caused by micro arc is generated, a high frequency pulse voltage is induced in a third inductor, namely, the inductor T3 because the high frequency pulse current is prevented from passing through the first and second inductors T1 and T2.

Since the high frequency coil element has a high impedance with regard to a high frequency AC signal, a voltage difference is generated across the high frequency coil element when a high frequency pulse voltage caused by an arc pulse is applied to the high frequency coil element. In a normal state, the high frequency choke inductor L1 allows a low frequency AC voltage to pass therethrough and, as such, no voltage difference is generated across the high frequency choke inductor L1.

The high frequency pulse voltage induced in the third inductor T3 is applied to the high frequency choke inductor L1 via a loop established by a first capacitor C1, a second capacitor C2, a first diode D1, and the high frequency choke inductor L1. As the high frequency choke inductor L1 is saturated by the high frequency pulse, a slight voltage is induced between both ends of the high frequency choke inductor L1, namely, between ends 1 and 2.

The end 1 of the high frequency choke inductor L1 is connected to an input terminal 2 of the first switching element Q1 by the second diode D2, which is a high frequency rectifier diode. The end 2 of the high frequency choke inductor L1 is connected to an input terminal 1 of the first switching element Q1. Accordingly, the voltage induced across the high frequency choke inductor L1 is rectified by the second diode D2 and, as such, a voltage difference is generated between the input terminals 1 and 2 of the first switching element Q1, thereby turning on the first switching element Q1.

When the first switching element Q1 is turned on, current may flow from a terminal 3 of the first switching element Q1 to the terminal 1 of the first switching element Q1. When micro arc disappears, the voltage induced in the high frequency choke inductor L1 also disappears and, as such, the first switching element Q1 is deactivated. Since the current path between the terminals 3 and 1 of the first switching element Q1 is closed in accordance with deactivation of the first switching element Q1, micro arc detection current flowing through a delay capacitor C4 disappears.

Thus, whenever micro arc is generated, a path, along which a micro arc detection current can flow, is temporarily established in the micro arc detector 11 and delay unit 13, to extend from the power line AC1 to the power line AC2 via a third diode D3, a fourth resistor R4, a delay capacitor 131 (C4), a sixth diode D6, and a fifth resistor R5, and then via the terminal 3 of the first switching element Q1, the terminal 1 of the first switching element Q1, and a fourth diode D4.

The micro arc detection current is generated in the form of a pulse in accordance with temporary connection of the terminals 1 and 3 of the first switching element Q1 whenever micro arc is generated.

Meanwhile, a first light emitting diode (LED) LED1 is provided as a signal lamp to inform of application of power to the power off device 10. A first resistor R1 is also provided to discharge a voltage across the second capacitor C2 during normal supply of power. It may be possible to display application of power by emitting light through driving of the first LED LED1 by micro current flowing through the first resistor R1.

In accordance with temporary connection between the terminals 1 and 3 of the first switching element Q1, a current path extending along the third diode D3, a second LED LED2, a third resistor R3, the terminal 3 of the first switching element Q1, the terminal 1 of the first switching element Q1, and the fourth diode D4 is also established.

Accordingly, it may be possible to turn on or off the second LED LED2 whenever micro arc is detected.

Meanwhile, when the high frequency pulse current caused by micro arc passes through the first and second diodes D1 and D2, low frequency components thereof are prevented from passing through the first and second diodes D1 and D2 by the first and second capacitors C1 and C2. Only high frequency components of the high frequency pulse current pass through the first and second diodes D1 and D2. As a result, after the pulse current passes through the first and second capacitors C1 and C2, only high frequency components thereof having several tens of MHz remain. Thus, noise components of several kHz to several thousands of kHz, which may be generated even during normal use of a load, is excluded from detection of arc and, as such, malfunction of the power off device 10 may be minimized.

The micro arc detection current generated by the micro arc detector 11 charges the delay capacitor 131 of the delay unit 13. The delay unit 13 generates an arc detection signal to turn on the first switch 161 when the voltage level of the delay capacitor 131 charged with the micro arc detection current caused by continuous arc in accordance with application of the micro arc detection current thereto exceeds a predetermined reference voltage, for example, a threshold voltage of a constant voltage element 133 such as a Zener diode ZD1.

When short arc is generated once or twice, the delay unit 13 does not generate an arc detection signal because the level of the voltage accumulated in the delay capacitor 131 does not exceed the predetermined reference voltage, for example, the threshold voltage of the Zener diode ZD1.

Furthermore, the delay unit 13 is configured such that, when arc is no longer generated, the delay capacitor 131 is immediately discharged by the delay resistor 132 with the passage of time.

Thus, the micro arc detector 11 may accurately detect continuous micro arc practically having high risk of fire while ignoring momentary or artificial arc having low risk generated once or twice.

In detail, referring to FIG. 3, the micro arc detection current, which is output from the first switching element Q1 of the micro arc detector 11, may be generated whenever a micro arc pulse is detected, while having a waveform substantially similar to that of the micro arc pulse. When the micro arc detection current is applied to the delay unit 13, this current charges the fourth capacitor C4 of the delay unit 13. The charging speed of the fourth capacitor C4 may be adjusted in accordance with current driving capacity of the first switching element Q1 and value of the fourth resistor R4 or fifth resistor R5.

When there is no sufficiently continuous or dangerous arc pulse, the first switching element Q1 is turned off and, as such, the micro arc detection current no longer flows. The charge accumulated in the fourth capacitor C4 until the micro arc detection current no longer flows may be discharged by a variable delay resistor R6. The discharge rate of the fourth capacitor C4 may be adjusted in accordance with variable resistance value of the variable resistor R6.

When an arc detection current is continuously generated due to presence of a sufficiently continuous arc pulse, a voltage sufficiently higher than the predetermined reference voltage may be induced across the fourth capacitor C4 and, as such, an arc detection signal may be generated.

For example, when an arc detection current flows continuously, the fourth capacitor C4 is continuously charged and, as such, the voltage across the fourth capacitor C4 may exceed, for example, the threshold voltage of the constant voltage diode ZD1, which may be implemented using a Zener diode. In this case, the constant voltage diode is turned on and, as such, the AC power line AC1 is connected to an input terminal 2 of a third switching element Q3, thereby turning on the third switching element Q3. In an ON state of the third switching element Q3, a current path is established between terminals 3 and 1 of the third switching element Q3. Current flowing from the terminal 3 to the terminal 1 in the third switching element Q3 may activate a first photocoupler PTC1 constituting the first switch 161 while functioning as an arc detection signal.

In addition, the fourth resistor R4, sixth diode D6, and fifth resistor R5 not only function to cause appropriate voltage drop of the delay unit 13, taking into consideration a high AC voltage level between the power lines, but also function to prevent backflow of current and to appropriately determine charging speed of the fourth capacitor C4.

Meanwhile, the second resistor R2 and third capacitor C3 are circuit elements connected to each other in order to protect the first switching element Q1 while achieving smooth turning-on operation of the first switching element Q1.

Figure 4:
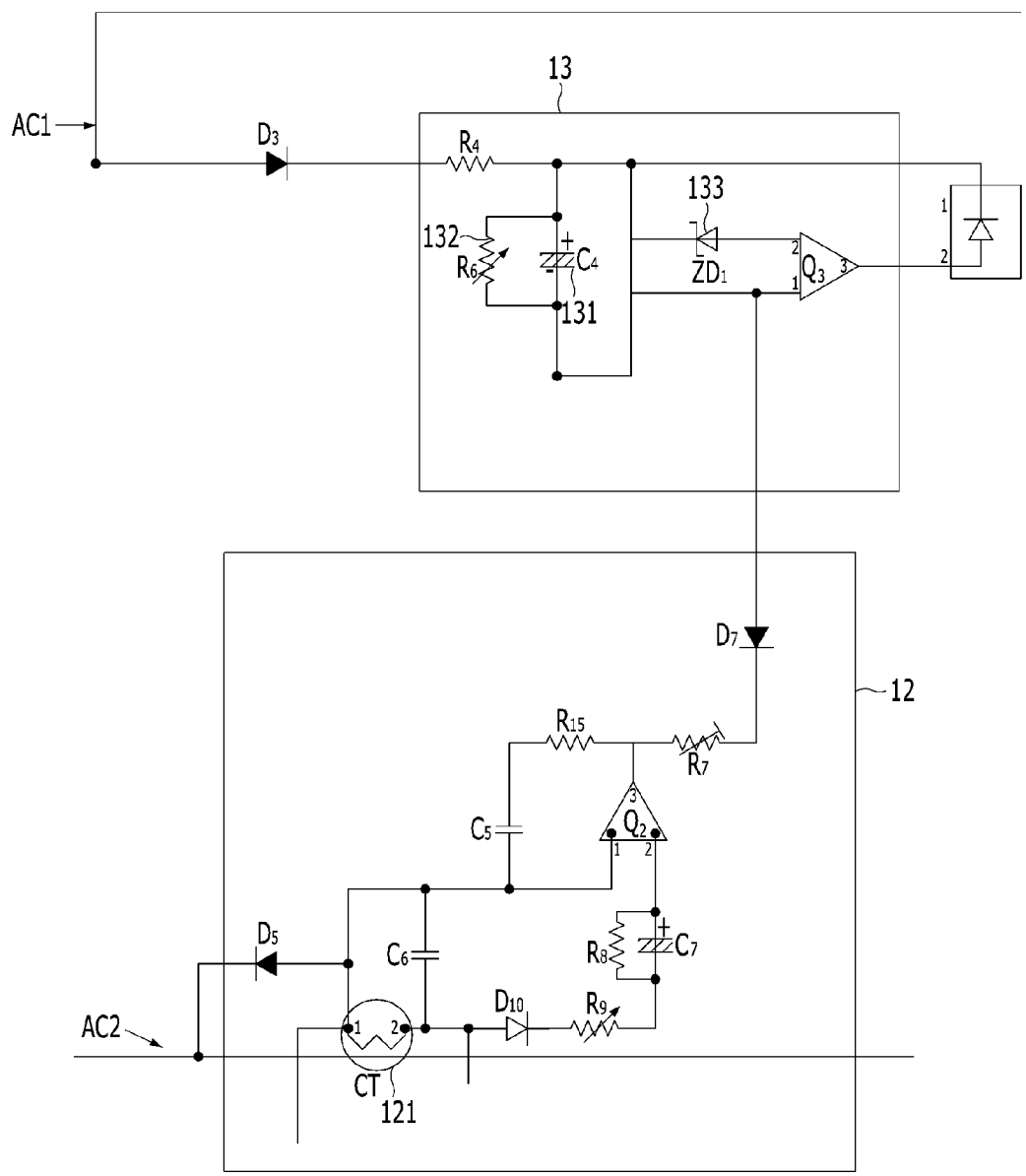
FIG. 4 is a circuit diagram of a high current arc detector in the power off device according to an embodiment of the present invention.

Hereinafter, the configuration and operation of the high current arc detector 12 will be described in more detail with reference to FIGS. 1, 2, and 4. FIG. 4 is a circuit diagram of the high current arc detector in the power off device according to an embodiment of the present invention.

The current sensor 121, which may detect abrupt variation of AC current, is installed at the AC power line AC2. When a pulse current flows from the output power terminal 19 to the input power terminal 18 in accordance with generation of high current arc, a certain voltage is induced across the current sensor 121, which may be, for example, a current transformer CT. The voltage induced in the current transformer 121 charges a detection capacitor C6 connected in parallel to both ends of the current transformer 121. When the charged voltage of the detection capacitor C6 is equal to or high than a predetermined voltage level, the high current arc detector 12 may generate a high current arc detection current.

This will be concretely described with reference to FIG. 4. The potentials of the input terminals 1 and 2 of the second switching element Q2 are substantially equal or have a difference making it impossible to turn on the second switching element Q2 in a normal state because the terminal 1 of the second switching element Q2 is connected to the power line AC2 via the fifth diode D5.

When high current arc is generated, a voltage is induced across the current transformer 121, rectified by a tenth high frequency diode D10, and then charged in a seventh capacitor C7 via a ninth resistor R9 and, as such, the charged voltage of the seventh capacitor C7 rises abruptly. As a result, the charged voltage of the seventh capacitor C7 is discharged and, as such, the potential of the input terminal 2 of the second switching element Q2 rises, thereby causing the second switching element Q2 to be turned on.

In accordance with turning-on of the second switching element Q2, a current path is established between the power lines AC1 and AC2 via the third diode D3, the fourth resistor R4, the delay capacitor C4, the seventh diode D7, the seventh resistor R7, the terminal 3 of the second switching element Q2, the terminal 1 of the second switching element Q2, and the fifth diode D5. As a high current arc detection current flows along the current path, charging of the delay capacitor C4 is achieved.

When high current arc disappears, charge accumulated in the seventh capacitor C7 is immediately discharged, and the second switching element Q2 is again deactivated and, as such, the current path is closed.

When the voltage accumulated in the delay capacitor C4 does not reach the threshold voltage of the Zener diode ZD1 during establishment of the current path or the voltage again charged in the delay capacitor C4 does not reach the threshold voltage of the Zener diode ZD1 because there is no further high current arc, the third switching element Q3 cannot be turned on. In this case, accordingly, no arc detection signal is generated.

Thus, the third switching element Q3 in the delay unit 13 is turned on to generate an arc detection signal, even when arc is generated once or twice, so long as the arc is harmful high current arc having possibility of fire. On the other hand, simple arc, which may be generated during use of an electric appliance, or slow arc, which may be generated by a fluorescent lamp or a blinker, may be ignored.

Meanwhile, a fifteenth resistor R15 and a fifth capacitor C5 may be provided as circuit elements connected to each other in order to protect the third switching element Q3 while achieving smooth turning-on operation of the third switching element Q3.

Thus, in association with operations of the micro arc detector 11 and high current arc detector 12, the delay unit 13 may include the delay capacitor 131, which is charged with at least a portion of a micro arc detection current or high current arc detection current, and the delay resistor 132, which discharges the charge accumulated in the delay capacitor 131, and may further include the constant voltage element 133, for example, the Zener diode ZD1, which is tuned on when the voltage accumulated in the delay capacitor 131 reaches a predetermined level, and the third switching element Q3, which is turned on when the constant voltage element 133 is turned on, to output an arc detection signal.

Figure 5:
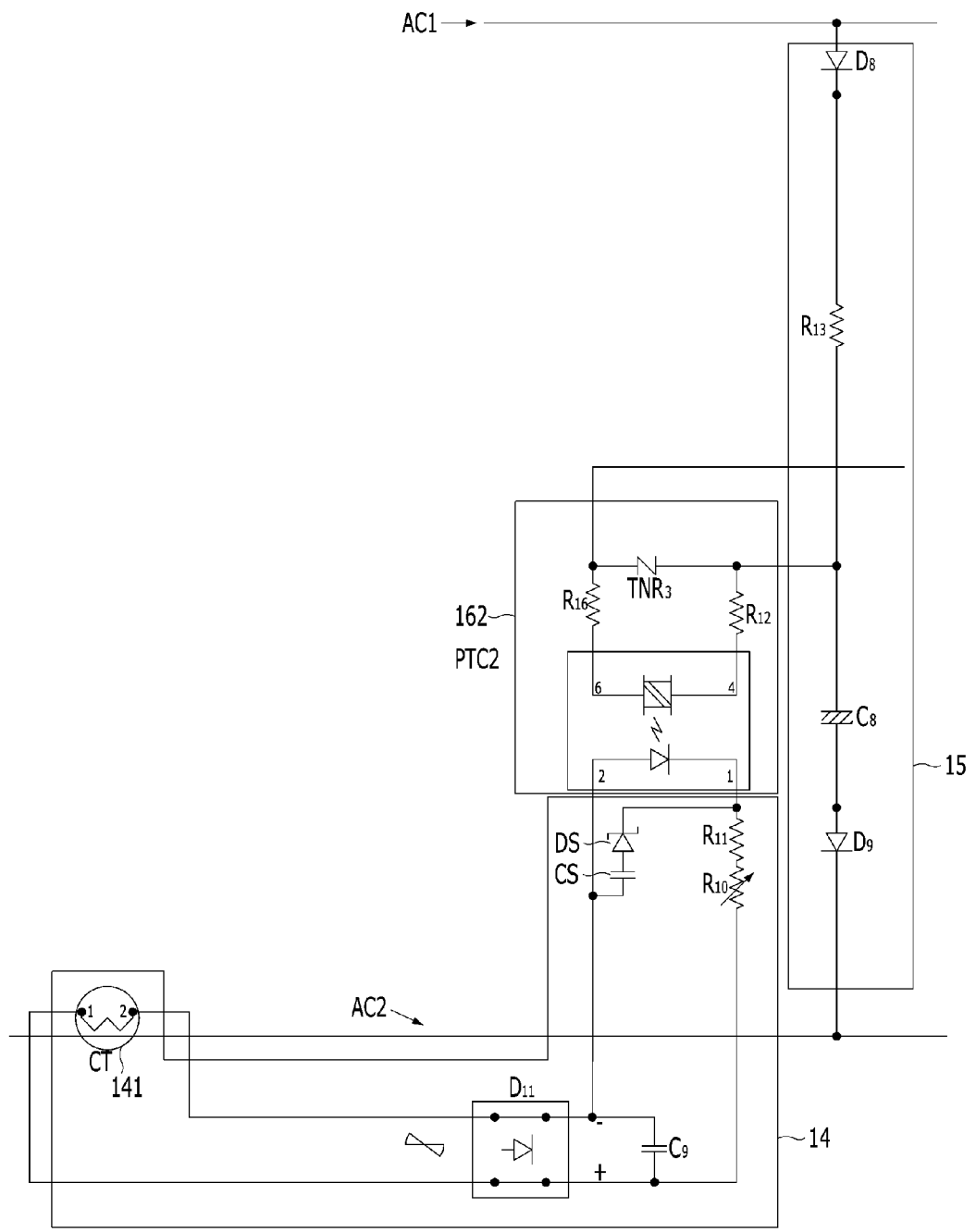
FIG. 5 is a circuit diagram of an overload detector in the power off device according to an embodiment of the present invention.

Hereinafter, the configuration and operation of the overload detector 14 of the power off device 10 will be described in more detail with reference to FIGS. 1, 2, and 5. FIG. 5 is a circuit diagram of the overload detector in the power off device according to an embodiment of the present invention.

The current sensor 141, which may detect abrupt variation of AC current, is installed at the AC power line AC2. Although the current sensor 141 is installed only for the overload detector 14 in the illustrated embodiment, the overload detector 14 may share the current sensor 121 with the high current arc detector 12 in accordance with another embodiment.

When overload or short circuit is generated at a load, abrupt current variation is generated at the AC power line AC2. However, such current variation is not detected by the high current arc detector 12 because the current variation has a frequency band and energy different from those of high current arc.

An AC voltage induced across the current sensor 141, which may be a current transformer CT, due to current variation as described above is converted into a DC voltage after passing through a bridge diode D11 and a ninth diode C9. The converted DC voltage may be applied, as an overload detection signal, to a second photocoupler PTC2 functioning as the second switch 162 via a tenth resistor R10 for current control and an eleventh resistor R11 for circuit protection.

A Zener diode DS for circuit protection and a capacitor CS for circuit protection are also provided to constitute a circuit for coping with abrupt voltage variation that may be generated at the current transformer CT.

Figure 6:
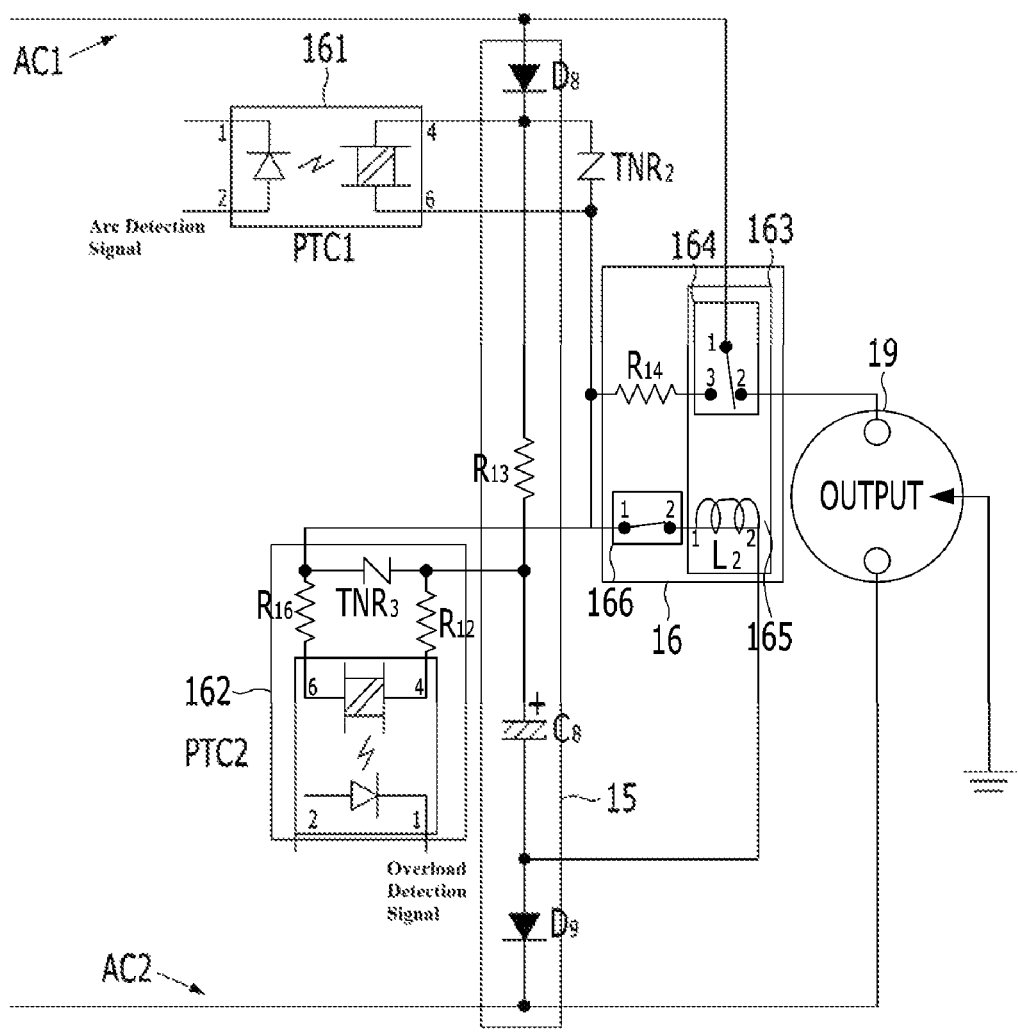
FIG. 6 is a circuit diagram of a power off unit in the power off device according to an embodiment of the present invention.

Hereinafter, the configuration and operation of the power off unit 16 of the power off device 10 will be described in more detail with reference to FIGS. 1, 2, and 6. FIG. 6 is a circuit diagram of the power off unit in the power off device according to an embodiment of the present invention.

The power off unit 16 may include the first switch 161, which is activated by an arc detection signal output from the delay unit 13, to control the relay 163, the second switch 162, which is activated by an overload detection signal output from the overload detector 14, to control the relay 163, and the relay 163, which is driven when connected to the supply voltage or the operating voltage from the operating voltage generator 15, to switch a connection state of supply power.

In accordance with an embodiment, the second switch 162 may apply the supply voltage to the relay 163. However, when overload or short circuit is generated in general cases, the impedance of a power line may function as a load and, as such, the power line may be abruptly overheated. As a result, a fire may be generated. Since the voltage of the power line AC1 is lowered in such a case, conventional relays exhibit decreased speed and increased errors.

To this end, it is necessary to provide a circuit for preparing an operating voltage. This circuit is the operating voltage generator 15. The operating voltage generator 15 stores an appropriate amount of electrical energy in a normal state, and sends the stored electrical energy to the relay 163 when the electrical energy is required, to drive the relay 163.

The operating voltage generator 15 is a DC voltage charging circuit constituted by an eighth diode D8, a thirteenth resistor R13, an eighth capacitor C8, and a ninth diode D9 arranged between the two AC power lines AC1 and AC2. A DC current rectified using the eighth diode D8 and ninth diode D9 flows to the thirteenth resistor R13 and eighth capacitor C8 and, as such, the eighth capacitor C8 is charged. Once the eighth capacitor C8 is completely charged, power consumption caused by the operating voltage generator 15 is a small matter because there is no discharge path.

When an arc detection signal is generated, the first switch 161 is closed and, as such, is connected to the power line AC1. In this state, accordingly, the first switch 161 applies the supply voltage from the power line AC1 to the solenoid drive coil 165 of the relay 163.

When an overload detection signal is generated, the second switch 162 is closed and, as such, applies the supply voltage, preferably, an operating voltage of a predetermined level charged in the operating voltage generator 15, to the solenoid drive coil 165 of the relay 163.

Meanwhile, the first and second switches 161 and 162 may be implemented using the photocoupler switches PTC1 and PTC2 or general relays, respectively. In this case, when an arc detection signal or an overload detection signal is activated, light emitting diodes included in the photocoupler switches PTC1 and PTC2 emit light, and light receiving diodes included in the photocoupler switches PTC1 and PTC2 receive the emitted light and, as such, electrical connection is achieved. When the first and second switches 161 and 162 are implemented using relays, the relays are closed when a micro arc detection signal or an overload detection signal is activated and, as such, electrical connection is achieved. The photocouplers and relays have characteristics of electrical insulation at both ends and prevention of backward signal transmission and, as such, generation and disappearance of detection signals are not influenced by operation of the relay 163.

In a normal state of the relay 163, the switching conductor of the triple terminal switch 164 is maintained at the position of the terminal 2 of the triple terminal switch 164. However, when the supply voltage or predetermined operating voltage is applied, the switching conductor is moved to the position of the terminal 3 of the triple terminal switch 164 by magnetic force generated in accordance with magnetization of the drive coil 165 and, as such, the triple terminal switch 164 is switched. When a magnetic field of the drive coil 165 disappears, the switching conductor is returned to the position of the terminal 2 by return force of a spring or the like.

The relay 163 may be implemented using a self-retaining relay. In this case, after the self-retaining relay is switched to one terminal position in accordance with application of an operating signal, the self-retaining relay may retain the switched terminal position by itself even when the operating signal disappears.

For example, the triple terminal switch 164 installed at the power line AC1 electrically connects the input power terminal 18 and the output power terminal 19 at the position of the terminal 2 in a normal state. However, once a magnetic filed is formed by the drive coil 165, the switch conductor is switched to the position of the terminal 3, thereby electrically connecting the input power terminal 11 (or the operating voltage generator 15) and the drive coil 165.

The drive coil 165 of the relay 163 has a terminal 1 connected to the power line AC1 while being connected to the eighth capacitor C8 of the operating voltage generator 15 via the second switch 162, and a terminal 2 connected to the power line AC2.

When the first switch 161 is turned on in a state in which the triple terminal switch 164 is switched to the terminal 2 thereof, current flows from the power line AC1 to the drive coil 165 via the first switch 161 and, as such, the drive coil 165 is magnetized. As a result, the triple terminal switch 164 installed at the power line AC1 is switched from the terminal 2 thereof to the terminal 3 thereof by magnetic force, thereby cutting off supply of power to the output power terminal 19. At the same time, the drive coil 165 is connected to the power line AC1 via the terminal 3 of the triple terminal switch 164 and, as such, current continuously flows to the drive coil 165.

Similarly, when the second switch 162 is turned on in a state in which the triple terminal switch 164 is switched to the terminal 2 thereof, current flows from the operating voltage generator 15 to the drive coil 165 via the second switch 162 and, as such, the drive coil 165 is magnetized. As a result, the triple terminal switch 164 installed at the power line AC1 is switched from the terminal 2 thereof to the terminal 3 thereof by magnetic force, thereby cutting off supply of power to the output power terminal 19. At the same time, the drive coil 165 is connected to the power line AC1 via the terminal 3 of the triple terminal switch 164 and, as such, current continuously flows to the drive coil 165.

Thus, once the self-retaining relay 163 is driven, the drive coil 165 of the self-retaining relay 163 operates continuously to cut off supply of power to the load even when the arc detection signal or overload detection signal is subsequently deactivated, in other words, the first switch 161 and second switch 162 are again opened, so long as supply power from the input power terminal 18 is connected to the self-retaining relay 163.

The manual return switch 166 is, for example, a push button switch. In a normal state, the manual return switch 166 is closed. When the user presses the manual return switch 166, the manual return switch 166 is opened during pressing thereof. When the manual return switch 166 is opened, electrical connection maintained between the terminal 3 of the triple terminal switch 164 and the drive coil 165 during driving of the self-retaining relay 163 is disconnected. That is, when the manual return switch 165 is turned off, current flowing through the drive coil 165 is cut off and, as such, operation of the self-retaining relay 163 is stopped. As a result, the triple terminal switch 164, which has been switched to the terminal 3 thereof by magnetic force of the drive coil 165, is again switched from the terminal 3 thereof to the terminal 2 thereof and, as such, supply of electric power to the load is resumed.

Figure 7:
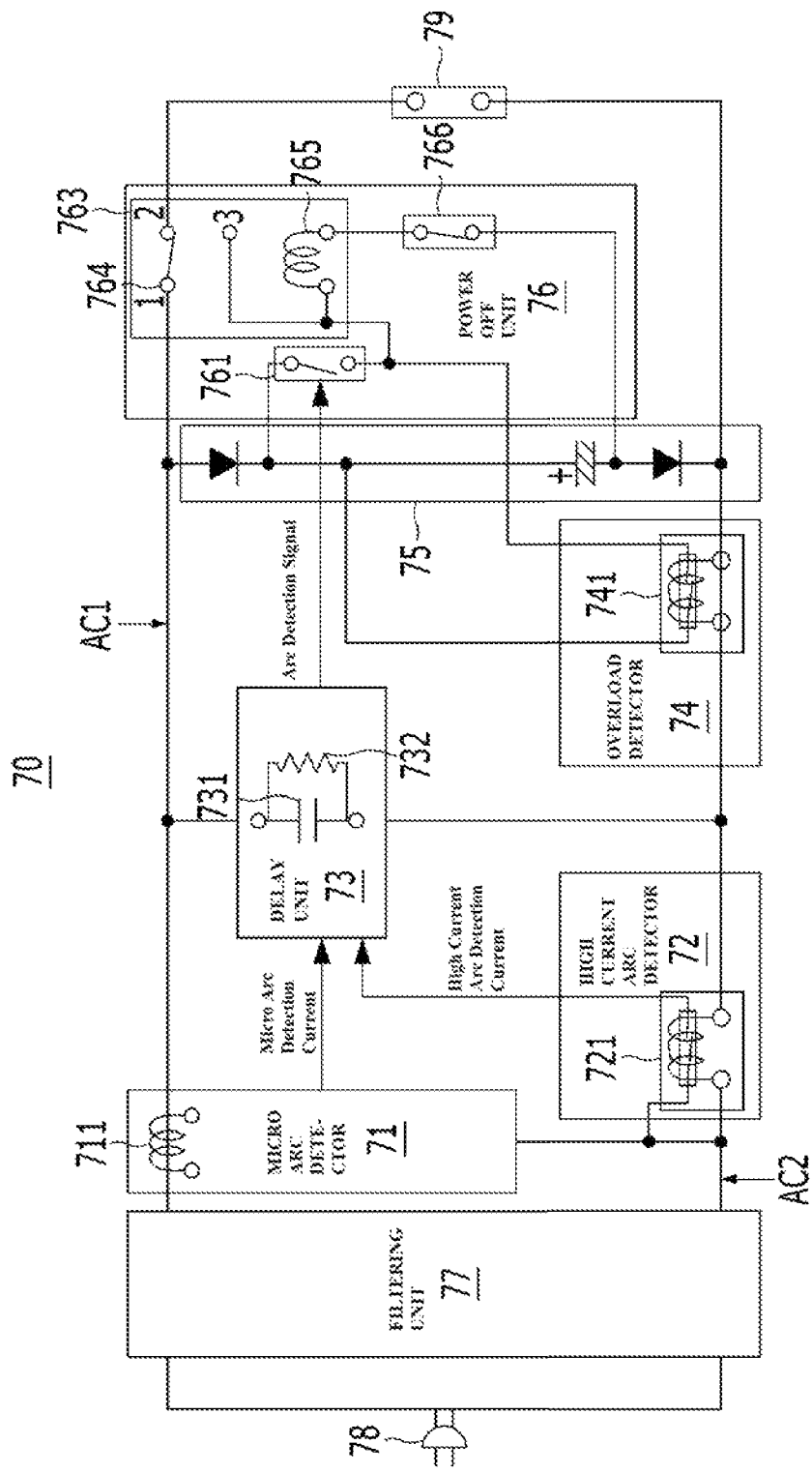
FIG. 7 is a block diagram illustrating a power off device according to another embodiment of the present invention.
Figure 8:
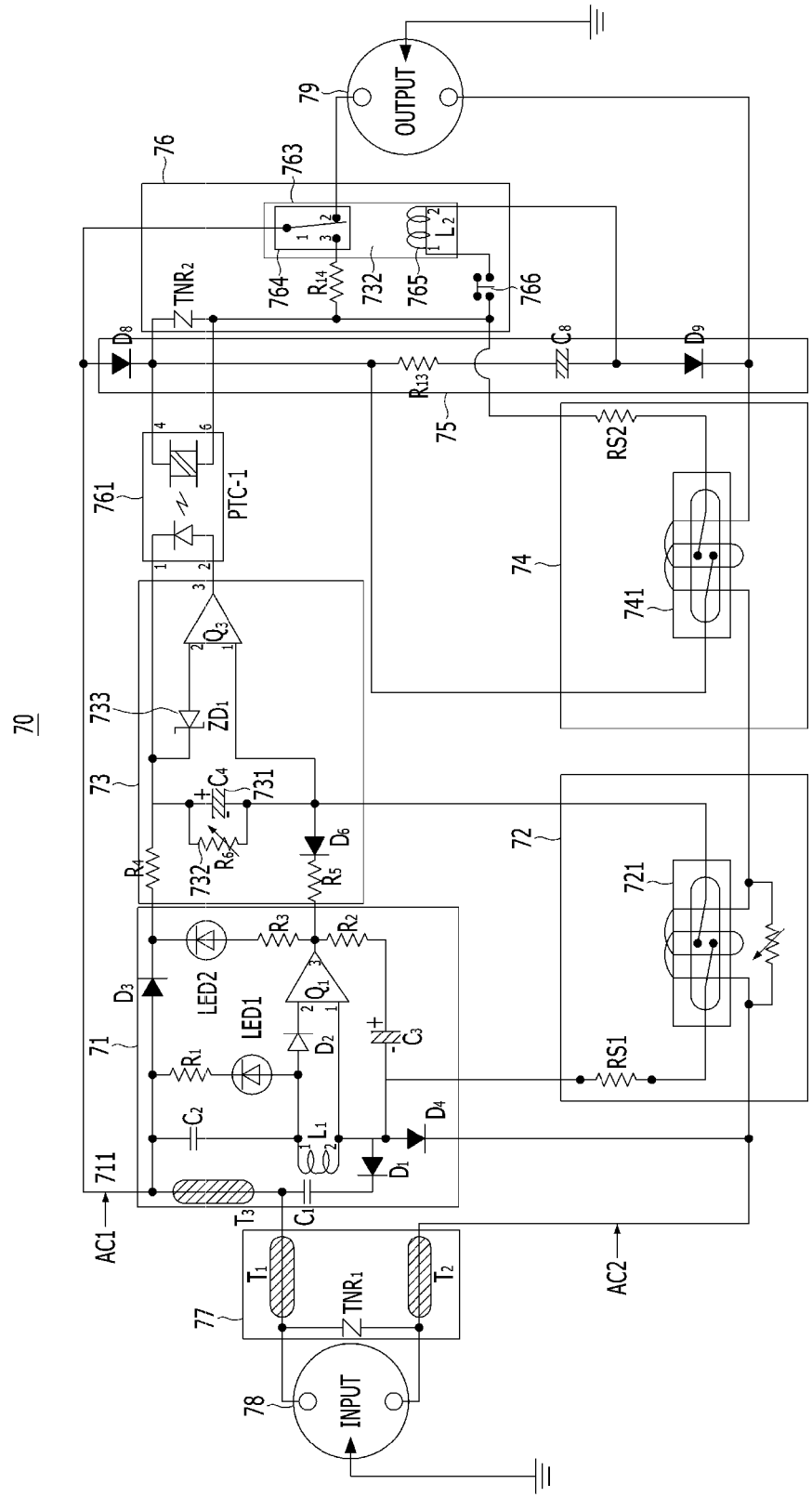
FIG. 8 is a circuit diagram concretely illustrating the power off device according to the latter embodiment of the present invention.

FIG. 7 is a block diagram illustrating a power off device according to another embodiment of the present invention. FIG. 8 is a circuit diagram concretely illustrating the power off device according to the latter embodiment of the present invention.

Referring to FIGS. 7 and 8, the power off device, which is designated by reference numeral "70", may include an input power terminal 78 at a grid power input side, and an output power terminal 79. The power off device 70 may also include a micro arc detector 71, a high current arc detector 72, a delay unit 73, an overload detector 74, an operating voltage generator 75, and a power off unit 76, which are connected between the input power terminal 78 and the output power terminal 79. The power off device 70 may further include a filtering unit 77.

The power off device 70 of FIG. 7 is substantially similar to the power off device 10 of FIG. 1. The micro arc detector 71, delay unit 73, operating voltage generator 75, and power off unit 76 in the power off device 70 of FIG. 7 are substantially identical to the micro arc detector 11, delay unit 13, operating voltage generator 15, and power off unit 16 in the power off device 10 of FIG. 1 and, as such, no description thereof will be given.

The micro arc detector 71 applies, to the delay unit 73, a micro arc detection current corresponding to an intensity of micro arc detected by a voltage sensor 711 connected to the power line AC1, for example, an inductor T3, whenever micro arc is detected.

For example, when a voltage type micro arc scarcely accompanying current is generated at a load device or a power line, the micro arc detector 71 detects a high-frequency pulse generated due to the micro arc, which propagates along the power line, based on a voltage induced in the inductor T3. Whenever such a high-frequency pulse is detected, the micro arc detector 71 outputs, to the delay unit 13, a micro arc detection current having the form of a pulse with an amplitude and a width corresponding to those of the detected high-frequency pulse.

The high current arc detector 72 may detect high current arc by a reed relay 721 using a coil capable of inducing variation of a magnetic field in accordance with high current arc. The high current arc detector 72 applies, to the delay unit 73, a high arc detection current whenever high arc accompanying high current is detected.

The reed relay is an element in which a coil is wound around a reed switch including two magnetic alloy members spaced from each other in a vacuum tube. The reed switch exhibits high speed and high reliance.

Hereinafter, operation of the reed relay 721 will be described. In a normal state of the reed relay 721, the two magnetic alloy members constituting the reed switch do not come into contact with each other when AC current flows through the coil. However, when high current arc flows to the coil, the magnetic field generated at the coil is strengthened and, as such, the two magnetic alloy members of the reed switch are magnetized with different polarities. As a result, the magnetic alloy members come into contact with each other, thereby turning on the reed switch.

The function of the reed switch 721 in the high current arc detector 72 may correspond to the functions of the current sensor 121 and second switching element Q2 in the high current arc detector 12 of FIG. 1. The high current arc detector 72 is similar to the high current arc detector 12 of FIG. 1 in that a coil is used, a magnetic field generated at the coil is greatly varied when high current arc is generated, and such variation causes switching resulting in formation of a current path. The high current arc detector 72 differs from the high current arc detector 12 in that variation of the magnetic field at the coil is generated using a voltage induced in another coil in the high current arc detector 12 of FIG. 1, whereas the high current arc detector 72 uses a magnetic body, which is more strongly magnetized due to magnetic field variation of the coil.

When high arc accompanying high current flows through the power line AC2, high current arc flows through the coil of the reed relay 721 and, as such, a strong magnetic field is generated, thereby turning on the reed switch. Accordingly, high current arc detection current may flow via the turned-on reed switch. Operation of the high current arc detector 72 will be described in detail with reference to FIG. 9.

The delay unit 73 may be implemented using an integrator capable of accumulating a micro arc detection current. The delay unit 73 is substantially identical to the delay unit 13 of FIG. 1 and, as such, no description thereof will be given.

Although the micro arc detector 71 and high current arc detector 72 are designed to use the delay unit 73 in common in the embodiment of FIG. 8, they may be designed to use separate delay circuits, respectively, or only the micro arc detector 72 may have a delay circuit in accordance with another embodiment. In this case, the delay circuits may output respective arc detection signals which may be, in turn, connected to respective switches of the power off unit 76, to activate the switches.

When current increase or voltage drop occurs in a power line due to overload or short circuit, the overload detector 74 is turned on, to supply electrical energy accumulated in the operating voltage generator 75 to a relay 763 of the power off device 76. As a result, the relay 763 is activated.

Similarly to the high current arc detector 72, the overload detector 74 detects an abrupt increase in AC current caused by overload of the power line AC2 or an abrupt increase in AC current caused by abnormal voltage drop, using a second reed relay 741. In accordance with the detection, the overload detector 74 may be turned on.

When abruptly increased current flows through the power line AC2, high current flows through a coil of the second reed relay 741, thereby generating a strong magnetic field. As a result, a reed switch of the second reed relay 741 is turned on. Accordingly, an overload detection signal may flow through the turned-on reed switch by a voltage charged in the operating voltage generator 75.

Detailed operation of the overload detector 74 will hereinafter be described with reference to FIG. 10.

The operating voltage generator 75 stores an appropriate amount of electrical energy in a normal state, and sends the stored electrical energy to the relay 763 when the electrical energy is required, to drive the relay 763.

The operating voltage generator 75 is a DC voltage charging circuit constituted by an eighth diode D8, a thirteenth resistor R13, an eighth capacitor C8, and a ninth diode D9 arranged between the two AC power lines AC1 and AC2. A DC current rectified using the eighth diode D8 and ninth diode D9 flows to the thirteenth resistor R13 and eighth capacitor C8 and, as such, the eighth capacitor C8 is charged. Once the eighth capacitor C8 is completely charged, power consumption caused by the operating voltage generator 75 is a small matter because there is no discharge path.

When a first switch 761 is closed by an arc detection signal, or the second reed relay 741 of the overload detector 74 is closed, the power line AC1 connected to the output power terminal 79 by the relay 763 is electrically disconnected and, as such, the power off unit 76 may cut off supply of power.

In accordance with embodiments, the first switch 761 may be implemented using an element capable of electrically connecting the relay 763 to an AC supply voltage or a DC operating voltage by signals output from the delay unit 73 and overload detector 74 or disconnecting the electrical connection, for example, a dual terminal switch, a photocoupler, or a dual terminal relay.

Meanwhile, the relay 763 of the power off unit 76 includes a triple terminal switch 764 installed at electric wires between the input power terminal 78 and the output power terminal 79. The triple terminal switch 764 operates to be connected to the output power terminal 79 or to a drive coil 765 in accordance with operation of the first and second switch 761 and second reed relay 741 and, as such, the power off unit 76 may enable supply of electric power to a load or may cut off the supply of electric power.

For example, in the relay 763, the drive coil 765, which may be a solenoid drive coil, operates in accordance with a DC voltage charged in the operating voltage generator 75 when the second reed relay 741 is closed. In this case, the connection contact of the triple terminal switch 764 is moved from a terminal 2 to a terminal 3 in accordance with operation of the solenoid drive coil 765 and, as such, electrical connection between the input power terminal 78 and the output power terminal 79 is disconnected. The relay 763 may be implemented using an electric device capable of performing a similar operation to the relay, for example, a switch or the like, differently than elements having a relay function.

Once the power off unit 76 cuts off supply of electric power to a load, the power-off state may be continued, so long as electric power from the outside is supplied to the power off unit 76 via the input power terminal 78. In addition, the power off unit 76 may further include a manual return switch 766 for manually resuming supply of power under the condition that supply of power has been cut off due to arc or overload. When supply of electric power to the relay 763 of the power off unit 76 is cut off by disconnecting the input power terminal 78 from a wall outlet or turning off the manual return switch 766, the power off unit 76 returns to a connection state established before the power-off operation. In a closed state of the manual return switch 766, the power-off state is maintained. When the manual return switch 766 is subsequently opened by the user, the magnetic field generated by the solenoid drive coil 765 of the relay 763 disappears and, as such, the switching conductor of the triple terminal switch 764 is returned to an original connection state, namely, the position of the terminal 2 of the triple terminal switch 764, to be again connected to a power path and, as such, power is again supplied.

Figure 9:
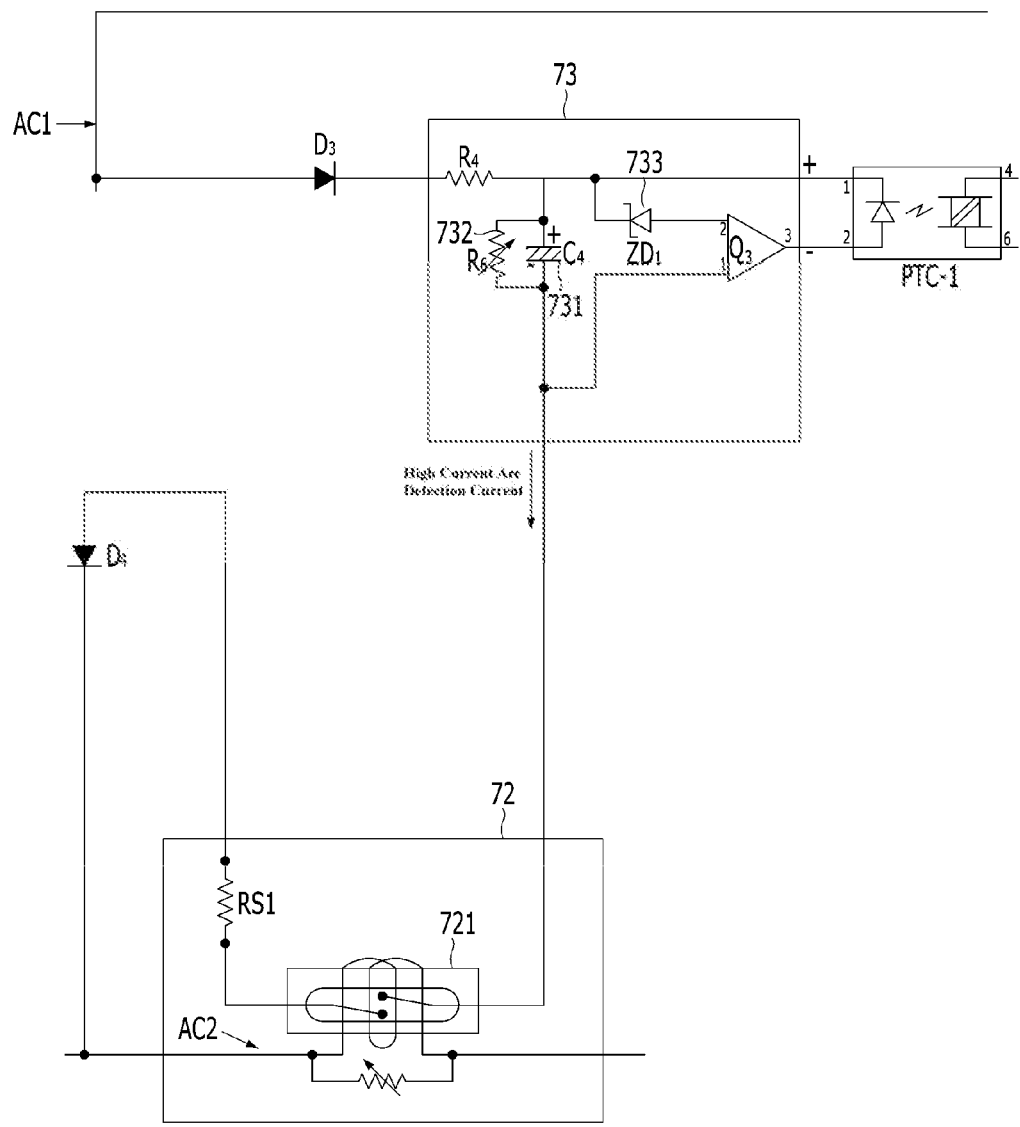
FIG. 9 is a circuit diagram illustrating a high current arc detector of the power off device according to another embodiment of the present invention.

FIG. 9 is a circuit diagram illustrating a configuration of the high current arc detector of the power off device according to another embodiment of the present invention.

Referring to FIGS. 7, 8, and 9, when a normal AC supply current flows to the power line AC2 in a normal state, the coil of the first reed relay 721 generates a weak magnetic field and, as such, cannot sufficiently magnetize the two magnetic alloy members of the reed switch. As a result, the reed switch is maintained in an opened state.

When high current arc is generated, high current flows through the coil of the first reed relay 721 due to the arc. As intensity of a magnetic field generated at the coil is abruptly increased, the two magnetic alloy members of the reed switch are magnetized with different polarities. When the strongly magnetized magnetic alloy members come into contact with each other, the reed switch is closed. As a result, a current path extending from the power line AC1 to the power line AC2 via the third diode D3, the fourth resistor R4, the fourth capacitor C4 of the delay unit 73, the closed reed switch of the first reed relay 721, a first switch resistor RS1, and the fourth diode D4 is established and, as such, a high current arc detection current flows along the current path.

When the voltage of the terminal 1 of the third switching element Q3 in the delay unit 73 is sufficiently lower than the voltage of the terminal 2 of the third switching element Q3 as the fourth capacitor C4 is charged with the high current arc detection current, the third switching element Q3 is turned on. As a result, a current path is established between the terminal 3 and the terminal 1 in the third switching elements Q3. The current flowing from the terminal 3 to the terminal 1 in the third switching element Q3 may activate the first photocoupler PTC1 constituting the first switch 761 while functioning as an arc detection signal.

Meanwhile, in the first reed relay 721, a resistor is connected to the coil of the first reed relay 721 in parallel. This resistor may function as an element functioning to bypass current when high current arc is generated, and to remove a magnetic field through consumption of energy accumulated in the coil after arc detection, in order to again open the reed switch.

Figure 10:
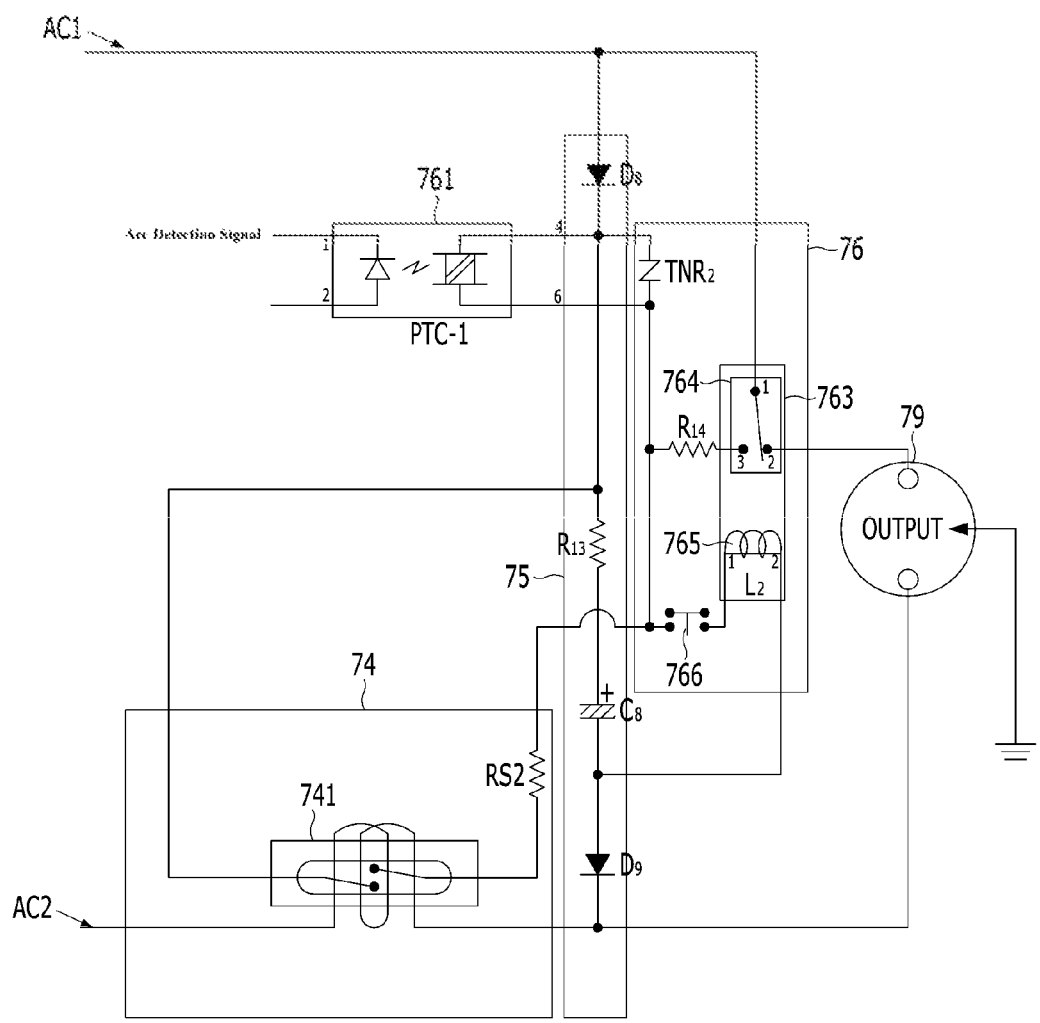
FIG. 10 is a circuit diagram illustrating an overload detector and a power off unit in the power off device according to another embodiment of the present invention.

FIG. 10 is a circuit diagram illustrating configurations of the overload detector and power off unit 76 in the power off device according to another embodiment of the present invention.

Referring to FIGS. 7, 8, and 10, when a normal AC supply current flows to the power line AC2 in a normal state, the coil of the second reed relay 741 generates a weak magnetic field and, as such, cannot sufficiently magnetize the two magnetic alloy members of the reed switch. As a result, the reed switch is maintained in an opened state.

When current is abruptly included due to overload, high current flows through the coil of the second reed relay 741. As intensity of a magnetic field generated at the coil is abruptly increased, the two magnetic alloy members of the reed switch are magnetized with different polarities. When the strongly magnetized magnetic alloy members come into contact with each other, the reed switch is closed. As a result, electrical energy charged in the eighth capacitor C8 of the supply voltage generator 75 is applied to the relay 763 of the power off unit 76 via the closed reed switch of the second reed relay 741.

Hereinafter, the configuration and operation of the power off unit 76 in the power off device 70 will be described.

The power off unit 76 may include the first switch 761, which is turned on by an arc detection signal output from the delay unit 73, and the relay 763, which is activated by an overload detection signal output from the overload detector 74, and driven when connected to the supply voltage or the operating voltage from the operating voltage generator 75, to switch a connection state of supply power.

When arc is generated, an arc detection signal is generated and, as such, the first switch 161 is closed. Accordingly, the relay 763 is connected to the power line AC1. In this state, accordingly, the supply voltage from the power line AC1 is applied to the solenoid drive coil 765 of the relay 763.

The first switch 761 may be implemented using the photocoupler switch PTC1 or a general relay. In this case, when an arc detection signal is activated, the light emitting diode included in the photocoupler switch PTC1 emits light, and the light receiving diode included in the photocoupler switch PTC1 receives the emitted light and, as such, electrical connection is achieved. When the first switch 761 is implemented using a relay, the relay is closed when a micro arc detection signal is activated and, as such, electrical connection is achieved. The photocoupler and relay have characteristics of electrical insulation at both ends and prevention of backward signal transmission and, as such, generation and disappearance of a detection signal are not influenced by operation of the relay 763.

When overload is generated, the second reed relay 741 of the overload detector 75 is closed and, as such, an operating voltage having a predetermined level charged in the operating voltage generator 75 is applied to the drive coil 765 of the relay 763. During normal supply of power to a load, certain electrical energy is stored in the operating voltage generator 75. When the overload detector 74 is turned on in accordance with detection of overload, the electrical energy stored in the operating voltage generator 75 is sent to the solenoid drive coil 765 of the power off unit 76. Based on the sent electrical energy, the relay 763 is driven.

In a normal state of the relay 763, the switching conductor of the triple terminal switch 764 is maintained at the position of the terminal 2 of the triple terminal switch 764. However, when the supply voltage or predetermined operating voltage is applied, the switching conductor is moved to the position of the terminal 3 of the triple terminal switch 764 by magnetic force generated in accordance with magnetization of the drive coil 765 and, as such, the triple terminal switch 764 is switched. When a magnetic field of the drive coil 765 disappears, the switching conductor is returned to the position of the terminal 2 by return force of a spring or the like.

Similarly to the relay 763 of FIG. 2, The relay 763 may be implemented using a self-retaining relay.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

MODE FOR INVENTION

Various embodiments have been described in the best mode for carrying out the invention.

INDUSTRIAL APPLICABILITY

The power off device according to the present invention, which is capable of cutting off supply of electric power through sensing of various arc and overload, can prevent an accident, for example, a fire, caused by sparks, arc, overload, voltage drop, or overheat, which may be generated due to an abnormal state of an electric line, an electric appliance, or the like, and can achieve sensing of micro arc and sensing of high current arc and, as such can be widely used in domestic and industrial power off devices or the like.

The invention claimed is:

1. A power off device comprising:
    a first detector for detecting an electric arc and turning on a first switching element, based on a voltage induced in a high frequency choke coil by a high frequency pulse current caused by the electric arc at a power line, and outputting a first electric current during turning-on of the first switching element, wherein the first electric current has a form of a pulse with an amplitude and a width, which correspond to those of the high frequency pulse current;
    a second detector for detecting a high current arc and outputting a second electric current during turning-on of a second switching element made based on variation of a magnetic field generated at a coil installed at the power line due to the high current arc generated at the power line, wherein the second electric current has a form of a pulse with a level and a generation time, which correspond to those of a voltage induced by the high current arc;
    a delay unit for accumulatively charging the first electric current or the second electric current in a delay capacitor at a predetermined time constant, and outputting an arc detection signal when a voltage across the delay capacitor reaches a predetermined level;
    a power off unit for electrically disconnecting a load from the power line when an operating voltage is applied; and
    a first switch for connecting the operating voltage to the power off unit in response to the arc detection signal, wherein
    the first detector comprises an inductor installed at the power line, to establish a loop together with the high frequency choke coil;
    the loop comprises a second capacitor connected in series between the inductor and a first terminal of the high frequency choke coil, a first diode, and a first capacitor, the first diode and the first capacitor being connected in series between the inductor and a second terminal of the high frequency choke coil;
    a fourth diode is connected between the second terminal of the high frequency choke coil and another power line; and
    the high frequency choke coil is connected in common, at the first terminal of the high frequency choke coil, to a control terminal of the first switching element and the second capacitor via a high frequency rectifier diode, and is connected, at the second terminal of the high frequency choke coil, to an input terminal of the first switching element, an anode of the second diode, and an anode of the fourth diode.

2. The power off device according to claim 1, wherein the second detector turns on the second switching element, based on the voltage induced in a current transformer in accordance with variation of the magnetic field generated at the coil installed at the power line due to current variation caused by the high current arc at the power line, and outputs the second electric current during turning-on of the second switching element to flow through the second switching element.

3. The power off device according to claim 1, wherein:
    the second switching element of the second detector is a reed switch;
    the second detector outputs the second electric current, during turning-on of the reed switch made based on variation of the magnetic field generated at the coil installed at the power line due to current variation caused by the high current arc at the power line, to flow through the reed switch.

4. The power off device according to claim 1, wherein the delay unit comprises:
- a delay resistor for discharging a charge accumulated in the delay capacitor by at least a portion of the first electric current or at least a portion of the second electric current;
- a constant voltage element to turn on when a voltage accumulated in the delay capacitor reaches a predetermined level; and
- a third switching element to turn on when the constant voltage element turns on, so as to output the arc detection signal.

5. The power off device according to claim 1, wherein the first switch comprises a coupling element for electrically connecting the power line and the power off unit when the arc detection signal is applied to a control terminal of the first switch.

6. The power off device according to claim 1, wherein the power off unit comprises a self-retaining relay to be electrically insulated from the load when the operating voltage is connected to the self-retaining relay as the first switch is turned on by the arc detection signal, and to maintain the electrically insulated state from the load even after the arc detection signal disappears.

7. The power off device according to claim 6, wherein the self-retaining relay comprises:
- a drive coil to be magnetized when the operating voltage is connected to the drive coil in accordance with turning-on of the first switch or a voltage from the power line is applied to the drive coil; and
- a triple terminal switch to be magnetically switched by magnetization of the drive coil from a position, at which the power line and the load are connected, to a position, at which the power line and the drive coil are connected.

8. The power off device according to claim 6, wherein:
the power off unit further comprises a manual return switch installed between the triple terminal switch and the drive coil; and the connection between the drive coil and the power line is disconnected when the manual return switch is opened during operation of the drive coil, and the triple terminal switch is switched to the position, at which the power line and the load are connected, simultaneously with the disconnection.

9. The power off device according to claim 1, further comprising:
an overload detector for outputting an overload detection signal when a DC voltage rectified from an AC voltage induced in a current transformer due to current variation caused by overload or short circuit exceeds a predetermined level.

10. The power off device according to claim 9, further comprising:
a second switch for connecting the operating voltage to the power off unit in response to the overload detection signal.

11. The power off device according to claim 10, further comprising:
an operating voltage generator for charging the rectified voltage in a capacitor connected between the power line and another power line, and supplying the charged voltage as the operating voltage.

12. The power off device according to claim 1, further comprising:
an overload detector for connecting the operating voltage to the power off unit via a second reed switch during turning-on of the second reed switch made based on variation of a magnetic field generated at a second coil installed at the power line due to current variation caused by overload or short circuit at the power line.

13. The power off device according to claim 12, further comprising:
an operating voltage generator for charging a rectified voltage in a capacitor connected between the power line and another power line, and supplying the charged voltage as the operating voltage.

* * * * *